March 10, 1964 W. T. REILLY ETAL 3,123,863
METHOD OF AND APPARATUS FOR FORMING
THERMOPLASTIC SHEET MATERIAL
Filed Dec. 4, 1959 2 Sheets-Sheet 1
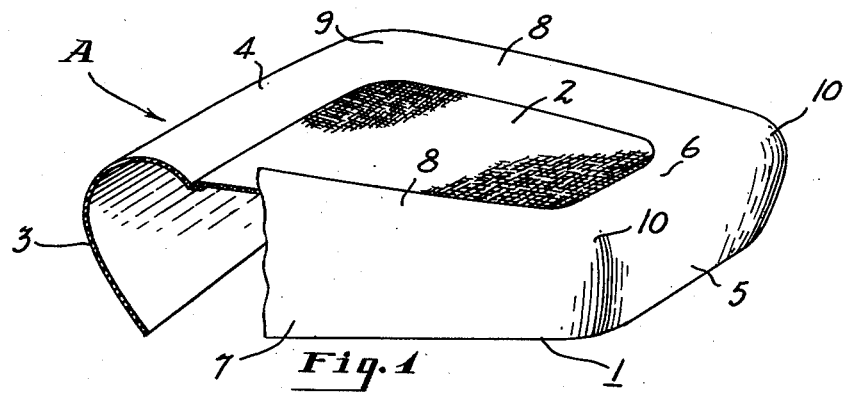
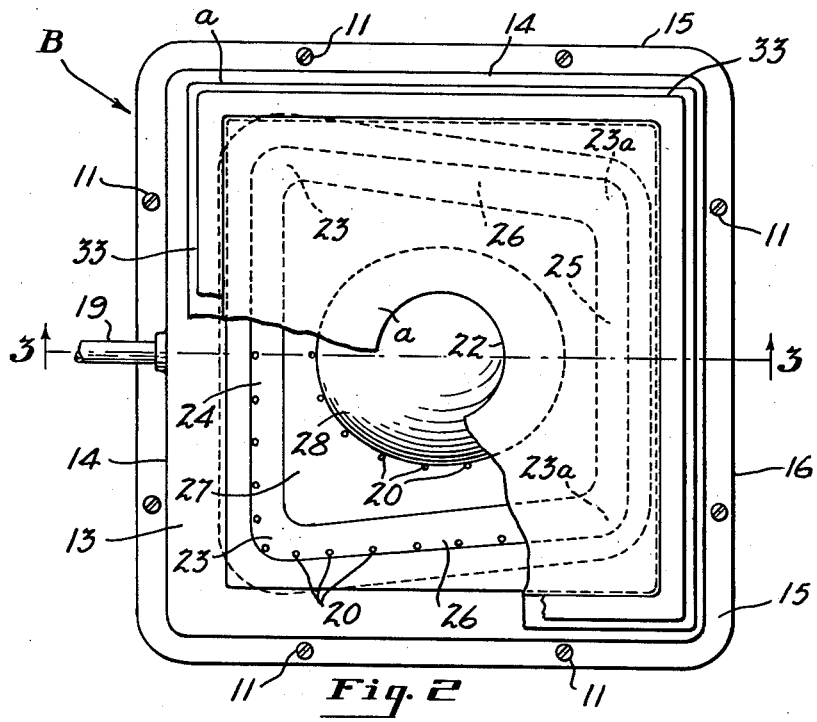
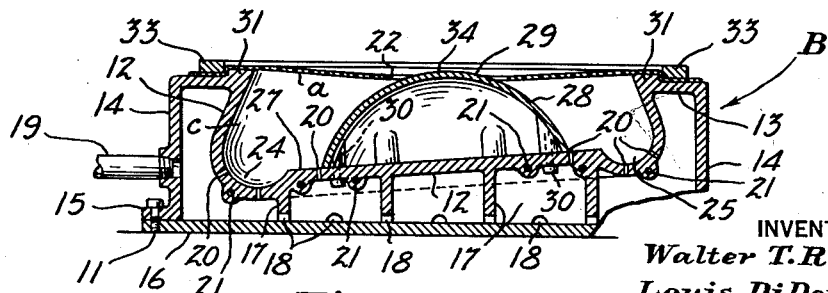
INVENTORS
Walter T. Reilly
Louis DiDonato
BY McCoy, Greene & te Grotenhuis
ATTORNEYS

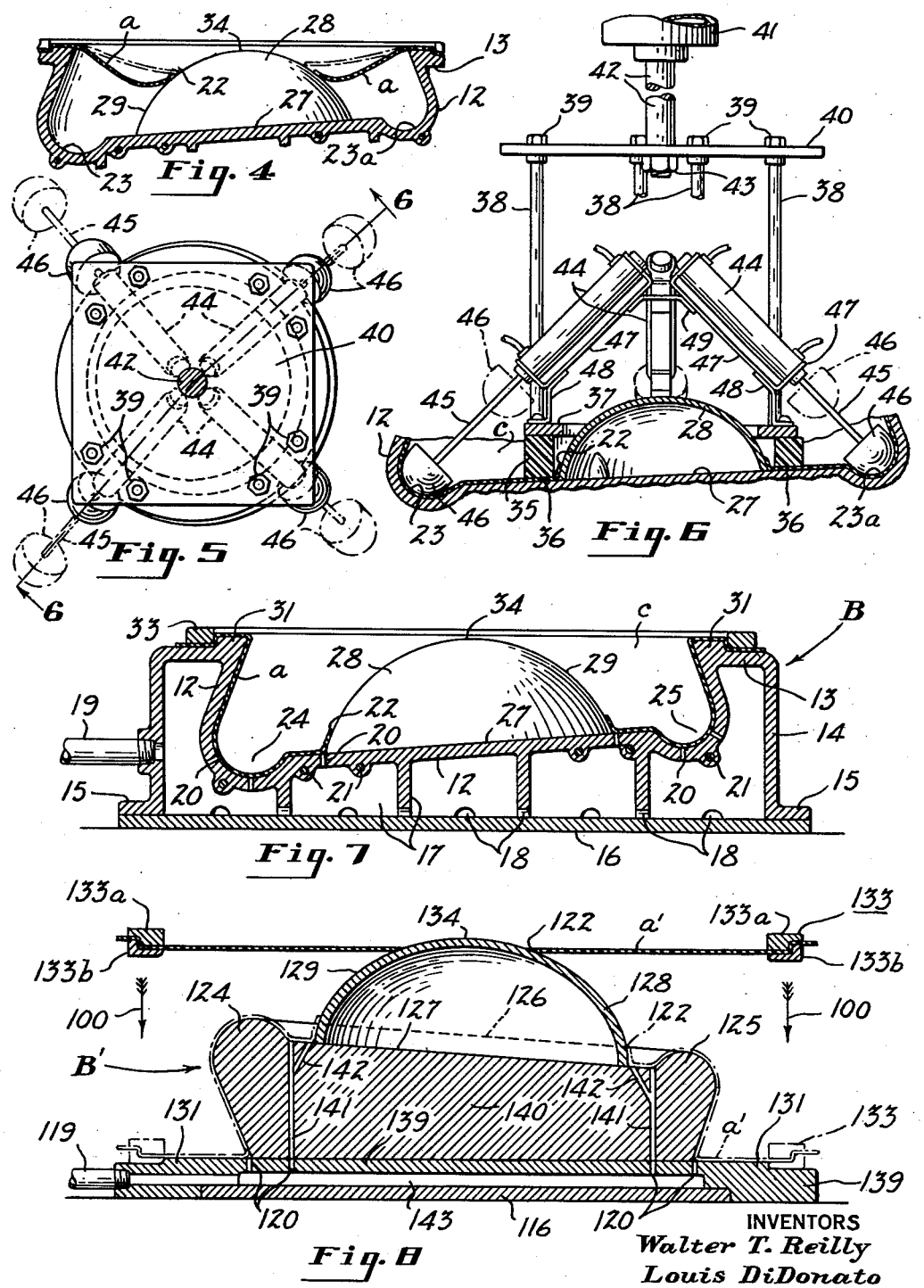

United States Patent Office 3,123,863
Patented Mar. 10, 1964

3,123,863
METHOD OF AND APPARATUS FOR FORMING THERMOPLASTIC SHEET MATERIAL
Walter T. Reilly, Akron, Ohio, and Louis Di Donato, Stoneham, Mass., assignors to The General Tire & Rubber Company, Akron, Ohio, a corporation of Ohio
Filed Dec. 4, 1959, Ser. No. 857,296
10 Claims. (Cl. 18—19)

The present invention relates to the forming of articles from plastic or other deformable materials and more particularly to a method of and apparatus for forming seats, backs, cushions or other articles from sheets of plastic (synthetic resins) or the like.

Various plastic materials may be molded and used to form portions of seats and backs for automobiles. We have found that the plastic portions of an automobile seat, for example, can be molded from flat sheets of polyvinyl chloride or other thermoplastic material by heating the sheets and drawing them into a suitable mold cavity, but the walls of the article are thinned down very much in the deep portions of the mold cavity due to the stretching of the sheet. When making a square or polygonal automobile seat having four corners, the plastic (resin) sheet tends to be thinnest at the corners where the most strength and durability is required. The final thickness at the corners is often less than one-fifth of the original thickness of the plastic sheet prior to the forming operation if ordinary procedures are followed.

We have discovered that improved articles can be made by pushing the material radially outwardly toward the deeper portions of the mold cavity during the molding operation and that articles such as automobile seats having four corners can be molded effectively without unduly reducing the thickness of the material at the corners. This method involves cutting a hole at the center of the plastic sheet during or prior to the main forming operation and is ideally suited for making the marginal portion of an automobile seat which is to be reinforced with a fabric or other material that will cover the resulting hole. The plastic sheet, which is preferably flat initially, is softened by heating to a predetermined temperature with radiant heaters or other suitable heating means and is then drawn by a fluid pressure differential over a tapered guide member or dome having a very smooth or polished surface which gradually recedes from its terminus so that the hole is enlarged as the marginal edge of the hole surrounding the guide member moves toward the large end of the guide member away from said terminus.

The pressure differential between the opposite surfaces of the plastic sheet, which is usually an air pressure differential created by a vacuum pump or the like, cooperates with the dome or other tapered guide member to push the plastic radially outwardly toward the deeper portions of the mold so as to avoid excessive thinning of the plastic as it moves into said deeper portions. It is thus possible to draw flat plastic sheets into cup-shaped polygonal articles, such as automobile seats or other articles having relatively deep corners, without unduly reducing the thickness of the plastic at any point.

Suitable pushers may be provided to help the plastic slide down over the dome and to assist in moving the plastic into the deep portions of the mold. The pushers may also be constructed to clamp the plastic sheet at the margins and provide a seal during the final forming operations. A separate pusher may be provided for each corner when molding generally rectangular articles such as seats or seat backs. The pushers may be temperature controlled to reduce the tendency to tear or shear the plastic.

Objects of the present invention are to provide a simple and inexpensive method of and apparatus for making automobile seats and backs or similar articles and to provide a method of molding deformable sheets which minimizes reductions in thickness of the material as the sheets are drawn into the desired shape.

A further object of the invention is to provide a one-piece polygonal seat portion having corners with sufficient thickness to be strong and durable.

Another object of the invention is to provide a method of moving material during a molding operation toward preselected portions of a mold.

Other objects, uses and advantages of the present invention will occur to those skilled in the art from the following description and claims and from the drawings in which:

FIGURE 1 is an isometric view on a reduced scale showing an automobile seat cushion assembly constructed according to the present invention with the corner of the assembly broken away and shown in section;

FIGURE 2 is a top plan view on a reduced scale with parts broken away and showing a mold according to the present invention for making the assembly of FIG. 1, the mold being shown with a flat plastic sheet mounted thereon prior to the forming operation;

FIGURE 3 is a vertical sectional view taken on the line 3—3 of FIG. 2 and on the same scale with parts broken away, the flat plastic sheet being shown in its position before it is softened by radiant heating;

FIGURE 4 is a fragmentary view similar to FIG. 3 showing in dot-dash lines the position of the plastic sheet shortly after it has been heated to a predetermined temperature and caused to sag into contact with the dome and in solid lines its position after vacuum has been applied and it has slid part way down the polished surface of the dome;

FIGURE 5 is a top plan view on a reduced scale with parts omitted showing the plastic pushers and associated mechanism;

FIGURE 6 is a fragmentary vertical sectional view of the apparatus with parts omitted and parts broken away showing the positions of the pushers at the end of the forming operation;

FIGURE 7 is a vertical sectional view similar to FIG. 3 and on a larger scale showing the position of the plastic sheet on the mold after the forming of the sheet is completed and prior to removal of the sheet from the mold; and FIGURE 8 is a vertical sectional view on a reduced scale showing a modified form of mold according to the present invention for making the plastic portion of the seat cushion assembly of FIG. 1, the plastic sheet being shown in solid lines in its position at the beginning of the forming operation and being shown in dot-dash lines in its position at the completion of the forming operation.

Referring more particularly to the drawings in which like parts are identified by the same numerals throughout the several views, FIGURE 1 shows a seat cushion assembly A for use in an automobile and having a generally trapezoidal upwardly facing surface. The assembly A includes an endless plastic marginal portion 1 and a generally trapezoidal flat fabric insert portion 2 attached to the portion 1, the portions 1 and 2 having a shape generally as shown in FIG. 1 which is drawn substantially to scale. It will be understood that the size and shape of the seat formed according to the present invention may vary considerably and that the method of the invention may be employed to make articles other than seats.

The marginal portion 1 may be formed of plasticized polyvinyl chloride, various copolymers of vinyl chloride and vinyl acetate and various other thermoplastic materials suitable for molding and sufficiently durable for use as a seat covering. The portion 1 has an upright front wall 3 which is curved slightly and a front top wall 4 which has greater curvature. The rear portion of the seat is formed in a similar manner and includes an upright rear wall 5 which is curved slightly and a rear top wall 6 curved generally like the wall 4, the wall 6 having an elevation materially less than that of the wall 4. The marginal portion 1 also includes upright side walls 7 which are curved slightly like the walls 3 and 5 and top side walls 8 which are curved to a greater extent like the walls 4 and 6, the side walls 7 gradually decreasing in height from the front to the rear of the seat A in the conventional manner.

The front corner portions 9 and the rear corner portions 10 of the seat A are curved rather sharply as is apparent from the shape of the mold cavity in FIG. 2. Forming of such deep corners without seriously reducing the thickness of the plastic and without weakening the walls of the cushion at these locations was very difficult prior to the present invention but the present invention solves this problem.

The plastic portion 1 of the seat cushion assembly A is formed as one piece from a flat plastic sheet $a$ of uniform thickness in a cast aluminum mold B of the type shown in FIGS. 2, 3 and 7 having a mold cavity $c$ with a shape corresponding to that desired for the portion 1. The mold B is cast so as to form a wall 12 that defines a mold cavity of generally quadrilateral cross-section, a flat horizontal top marginal wall 13 extending radially outwardly from the top of the wall 12, and a vertical marginal wall 14 extending downwardly from the margin of the wall 13. The bottom of the wall 14 is shaped to provide a radially outwardly projecting horizontal marginal flange 15 which is rigidly connected to a flat horizontal base or plate 16 by a series of screws 11. The aluminum casting above the base 16 includes a series of vertical panels 17 integral with the wall 12 and crossing at right angles like the dividers of an egg box, a series of panels 17 extending in a longitudinal direction and crossing a series of panels 17 that extend in a transverse direction. Openings 18 are provided in the bottom of the panel 17 so that each of the spaces formed between adjacent panels communicates with all the other spaces between the wall 12 and the base 16 and with the pipe 19 which is connected to a vacuum pump or other source of subatmospheric pressure. Any suitable means may be provided for heating the plastic sheet $a$ or the interior of the mold B. As herein shown, heating may be effected by a series of heating rods 21 which are connected to an electrical source (not shown). Heating and/or cooling of a mold is conventional and forms no part of the present invention.

The mold B is shaped as shown in FIGS. 2, 3 and 7, which are drawn substantially to scale, and has a recess 24 of uniform arcuate cross section a short distance above the base 16 and similar recess 25 of uniform arcuate cross section spaced a greater distance above the base 16. Similar side recesses 26 are provided which have uniform arcuate cross section and extend from the recess 24 to the recess 25, the recesses meeting at the corners 23 of the mold. The recesses 24, 25 and 26 of the mold cavity $c$ have a shape corresponding to that of the top wall portions 4, 6 and 8, respectively, and the recesses at the corners 23 of the mold have a shape corresponding to the corner portions 9 and 10 as will be apparent from the drawings. The mold B has a flat inclined generally trapezoidal surface 27 that extends to the inner margins of the recesses 24, 25 and 26, the recess 24 having a length greater than that of the recess 25 as indicated in FIG. 2.

A tapered guide member 28 is rigidly mounted on the central portion of the surface 27 and covers the major portion of said surface. Such guide member projects upwardly from the surface 27 and has a smooth polished surface 29 which gradually recedes from the terminus 34 of the guide member so that the inner edge 22 of the flat plastic sheet $a$ will slide down the guide member and be radially enlarged as the plastic sheet is pulled by vacuum into the mold cavity. The surface 29 is shaped so as to avoid sudden stretching or tearing of the plastic sheet and preferably has a surface roughness not in excess of 10 microinches. The guide member 34 may have various shapes and may be generally conical or pyramidoidal but is preferably free of reversals in curvature and shaped so as to have relatively low curvature at any point.

A hemisphere provides good results when making seats of certain shapes, but when making a generally trapezoidal seat similar to the seat A of FIG. 1 it is preferable to employ a semiellipsoidal guide member or one shaped somewhat like the insert portion 2. As herein shown, the outer surface of the guide member 34 is a semiellipsoid having its long axis crossing the recesses 24 and 25 and on the line 3—3 as indicated in FIG. 2. This guide member is rigidly connected to the wall 12 by bolts 30 as indicated in FIG. 3. The semi-ellipsoid is symmetrical as indicated in the drawings, but symmetry is not essential.

A flat rectangular sheet $a$ of uniform thickness is placed on the top of the mold on the flat surface of the raised marginal portion 31 of the mold and is held in place by a rectangular holding frame or clamp 33 which clamps the sheet against the shoulder formed by the portion 31 as indicated in FIGS. 3 and 8. The sheet has a circular hole therein as indicated in FIGS. 2 and 3 with its center located directly above the terminus 34 of the dome 28. The edge 22 at the margin of the circular hole is moved downwardly against the polished surface 29 by gravity after being heated by radiant heaters to a predetermined temperature and assumes a position as indicated in dot-dash lines in FIG. 4. The polished surface 29 cooperates with the plastic material in the vicinity of the edge 22 to provide means for preventing entry of air into the mold cavity so that a low pressure may be created in the mold cavity.

As the vacuum is applied, the heated sheet $a$ is drawn tightly against the dry highly polished surface 29 and is pulled into the mold cavity, the edge 22 moving from a position as indicated in dot-dash lines in FIG. 4 downwardly and radially outwardly on the surface 29 through the position indicated in solid lines in FIG. 4 to a position near the surface 27 as indicated in FIG. 6. This causes radial stretching and deforming of the plastic and pushes the plastic toward the recesses 24, 25 and 26 and toward the corners 23 of the mold. After the plastic sheet $a$ contacts the dry flat surface 27, it then is drawn radially outwardly into the radially outer portions of the recesses 24, 25 and 26. This radial outward movement tends to move the edge 22 downwardly on the dome and to move the radially inner portion of the sheet $a$ radially outwardly on the surface 27. Such movement does not break the seal so as to permit air to enter between the sheet $a$ and the mold surfaces but the amount of the radial outward movement sometimes must be limited to prevent movement of the plastic off of the surface 27.

In making the seat A by the method shown in the drawings, the amount of radial outward movement of the plastic into the recesses 24, 25 and 26 rarely causes any difficulty, and it is unnecessary to use a pusher ring or hold-down clamp 35 of the type shown in FIG. 6. However, it is preferable to use a hold-down frame similar to the ring 35 to hold the radially inner portion of the sheet $a$ tightly in position as indicated in FIG. 6 after the edge 22 has moved a predetermined distance down the polished surface 29. By use of such clamping means it is possible to control the movement of the sheet more accurately and to obtain more uniform wall thickness, but it will be apparent that such means is not essential for the practice of this invention.

The clamping hold-down means may be rounded or generally rectangular but preferably has a shape similar to the margin of the dome 28. As herein shown, the hold-down or pusher ring 35 has an elliptical shape similar to that of the dome 28 and is of a size to engage the flat surface 27 throughout the periphery of the dome as indicated in FIGS. 5 and 6. The bottom surface 36 of the pusher ring 35 is flat and inclined relative to its flat horizontal upper surface at the same angle as the surface 27 whereby the ring has greater axial height on one side than on the other. The pusher ring is rigidly connected to a flat metal ring 37 which in turn is rigidly connected by a series of long vertical connecting rods 38 and nuts 39 to a flat rectangular horizontal supporting plate 40. If desired, a yieldable connection may be provided between the metal plates 37 and 40 to cushion the impact of the pusher ring 35 on the surface 27. Means is provided for moving the pusher ring 35 from a retracted position above the mold B to the position shown in FIG. 6 comprising a reciprocating pneumatic or hydraulic motor. As herein shown, such motor comprises a hydraulic cylinder 41 having a reciprocable piston rod 42 rigidly connected to the plate 40 by a nut 43. As the edge 22 is expanded and moved downwardly over the polished surface 29 of the dome, the motor 41 may be actuated to move the pusher ring 35 against the sheet $a$ so that the pusher ring helps to move the plastic sheet over the dome, but it will be understood that the actuation of the motor may be delayed until the sheet $a$ engages the surface 27 in which case the ring 35 serves merely as a clamp to maintain an effective seal.

At the completion of the forming operation the plastic sheet has a shape as indicated in FIG. 7 and conforms exactly to the shape of the mold cavity. The plastic is then allowed to cool and is removed from the mold manually. The plastic is stretched to the greatest extent during molding as it moves into the corner portions 23 of the mold recess. It is found, however, that the dome 28 pushes enough of the plastic radially outwardly toward the corners of the mold so that the corner portions 9 and 10 of the resulting seat A have sufficient thickness to be strong and durable.

The plastic will move into the corners 23 of the mold recess under the vacuum without manual assistance but it is often desirable to push the plastic into the corners 23 manually with a plastic pusher, an asbestos pad or the like to insure that no wrinkles are formed and to be sure that the plastic moves evenly and that the wall thickness is uniform at the corners. As herein shown, generally hemispherical pushers 46 are provided for assisting in moving the plastic into the four corners (23 and 23a) of the mold. Such pushers may be formed of asbestos or a suitable plastic which can withstand the temperatures employed during the forming operation.

It is preferable to provide a plurality of yieldable means for moving the pushers into the mold individually so that uniform pressure will be applied. As herein shown, four hydraulic motors 44 are rigidly mounted in inclined radially extending positions on the metal ring 37, the reciprocating piston rods of such motors being rigidly connected to the pushers 46. The cylinder of each motor 44 is rigidly mounted on a U-shaped motor bracket 47 which is rigidly connected to the ring 37 by a leg bracket 48. The four motor brackets 47 are rigidly connected to a central plate 49 above the center of the ring 37. The arrangement of the motors is illustrated in FIGS. 5 and 6 which are drawn substantially to scale, the retracted positions of the pushers 46 being shown in dot-dash lines. Such pushers are actuated after the pusher ring 35 has been moved against the surface 27 as the plastic starts to move into the corners of the mold under the vacuum. The pushers 46 assist in maintaining the uniform cross section of the plastic at the corners of the mold by assisting in moving the plastic radially outwardly. After the pushers 46 have moved the plastic into the four corners 23 and 23a, the motors 44 are actuated to retract the pushers, and the motor 41 is actuated to retract the ring 35 and the entire assembly, including the pushers 46, to a position above the mold.

The sheet $a$ may be drawn into the mold cavity when the dome 34 is omitted so as to form the marginal portion 1 of the seat but such a method of forming is unsatisfactory because the corner portions 9 and 10 are reduced in thickness to about 1/6 to 1/4 the original thickness of the plastic sheet $a$. If the sheet $a$ has an original uniform thickness of .040 inch in the flat condition and is heated and drawn into the cavity of the mold B to the position shown in FIG. 7, the extreme bottom corners 9 and 10 of the portion 1 will be thinned down to about .007 to .010 inch. If, however, the same sheet with a uniform thickness of .040 inch is heated and drawn over the dome 28 and into the mold recess according to the method described above, the extreme bottom corners 9 and 10 can be maintained at about .020 inch thickness or about 2 to 3 times the thickness previously obtained. This is at least a 100% improvement in the seat at the corners thereof.

The use of the dome also saves material since you are able to start with a thinner sheet $a$ and use a greater percentage of the sheet in forming the article. It is not practical to double the original thickness of the plastic sheet $a$ in order to obtain sufficient thickness at the corners 9 and 10 of the seat since the major portion of the seat would be undesirably thick if formed in this manner and the corner portions of the resulting seat would be subjected to undesirable strains during the forming operation. Also, the seat would be unduly expensive.

It is found, that the polished surface 29 and the similarly polished surface 27 will effect a satisfactory seal between the plastic and the metal, but it will be apparent that auxiliary rings may be employed, if desired, to improve the seal and that hold-down means such as the frame 35 may be employed in extreme designs to permit difficult forming operations. It will also be apparent that the location of the holes 20 may be varied to move the plastic in the most efficient manner.

Any suitable thermoplastic material may be used in performing the present invention. A polyvinyl chloride homopolymer, for example, will provide excellent results. The selection of the material forms no part of the present invention, however, since it will be apparent that the method of this invention can be applied to various materials which will flow or move when subjected to fluid pressure.

An article of the type shown in FIG. 1 is preferably made by the method of this invention in a mold having a female mold cavity but it will be apparent that advantages of the invention can also be obtained when the article is formed on a male mold B'. The mold B' comprises a vertically projecting mold member 140 having air passages 141 and 142 therein terminating at a flat generally trapezoidal inclined surface 127 similar to the surface 27. The member 140 has upwardly projecting portions 124, 125 and 126 of uniform arcuate cross section shaped like the recesses 24, 25 and 26, respectively, the marginal portion of the member 40 corresponding in shape to that of the plastic marginal portion 1 of the seat A. The member 140 is rigidly mounted on an upper base 139 having a shoulder 131 similar to the shoulder at the margin of the portion 31.

A flat base or plate 116 seals the bottom of the base 139 to form an air chamber 143 which communicates with a vacuum pipe 119. Air is evacuated from below the plastic sheet $a'$ by a series of air passages 120, the passages 41 being vertically aligned with the passages 120 so as to conduct air away from the marginal portion of the surface 127. A dome 128 of semiellipsoidal form which recedes from its terminus 134 is rigidly mounted on the mold member 140 and has a polished surface 129 for engaging the inner edge 122 of the circular hole in the sheet $a'$ to provide an air seal. The marginal portions of the sheet $a'$ are clamped between the upper and lower portions 133a and 133b of a frame 133 and are moved downwardly in the direction of the arrows 100 as vacuum is applied, it being understood that means may be provided to prevent entry of air radially inwardly between the frame 133 of the marginal portion of the base 139 so that a vacuum can be obtained even before the frame 133 engages the base 139. The frame portion 133b has internal dimensions corresponding substantially to the external dimensions of the shoulder 131 so as to fit on such shoulder as indicated in dot-dash lines in FIG. 8.

It will be apparent how the plastic articles are formed on the mold B'. The sheet a' is softened by radiant heat preferably while in the upper position shown in solid lines in FIG. 8 and is lowered with the frame 133 into engagement with the dome 123 as fluid pressure is applied to the sheet. During downward movement the edge 122 slides down the polished surface 129 to the position shown in dot-dash lines and is expanded radially during such movement so as to push the plastic radially outwardly and reduce the thinning out of the plastic at the corner portions of the mold. At the completion of the forming operation of the plastic conforms to the mold as indicated in dot-dash lines and has a shape corresponding to that of the seat portion 1.

The mold B and the rigid parts associated therewith have been drawn substantially to scale in FIGURES 2, 3 and 7 to facilitate an understanding of the invention, and it will be understood that a mold may be made substantially as shown in the drawings but that various improvements probably would be made in the mold and the heating apparatus and that the size of the equipment may vary considerably. The thickness of the plastic sheets $a$ and $a'$ is not shown accurately since it is necessary to exaggerate the thickness when showing these sheets on a small scale.

It will be understood that the above description is by way of illustration rather than limitation and that, in accordance with the provisions of the patent laws, variations and modifications of the specific methods and devices disclosed herein may be made without departing from the spirit of the invention.

Having described our invention, we claim:

1. A method of making an article from a sheet of thermoplastic material comprising forming a hole in said sheet surrounded by an inner marginal edge, heating the sheet to soften it, placing the softened sheet on a smooth guide member which recedes from its terminus and has a size greater than that of said hole so that the edge surrounds said terminus, moving the sheet downwardly over said guide member to a position near the bottom of said guide member to stretch said material and increase the peripheral length of said edge, and moving portions of said sheet spaced from said edge radially outwardly to reduce the thickness of the sheet and cause the sheet to conform to a predetermined shape.

2. A method as defined in claim 1 wherein the sheet is drawn over a mold member having a smooth projecting surface of generally quadrilateral cross section surrounding said guide member and is caused to conform to said projecting surface.

3. A method as defined in claim 1 wherein the sheet is drawn into a mold cavity having a smooth internal surface of generally quadrilateral cross section surrounding said guide member and is caused to conform to said internal surface.

4. A method of vacuum forming generally cup-shaped articles from a soft sheet of deformable non-metallic material comprising forming a round hole in said sheet near the center thereof, holding the marginal portion of the sheet and creating a fluid pressure differential between the opposite faces of said sheet to draw the sheet into a cup while applying radial pressure to the sheet uniformly at the edge of said hole to enlarge said hole and minimize thinning of the sheet at the corners of said cup.

5. A method of making a cup-shaped generally trapezoidal article such as an automobile seat or cushion from a generally flat polygonal sheet of thermoplastic vinyl resin comprising forming a hole in the central portion of said sheet, clamping the marginal portion of said sheet and supporting the same over a mold having a cavity with a predetermined shape corresponding to that of the marginal portion of said article, heating the sheet to a predetermined temperature to soften the same, applying fluid pressure to the sheet to move it into said cavity while simultaneously applying radial outward pressure substantially uniformly to the inner edge of said hole to enlarge the hole without tearing said sheet and holding said marginal portions of the sheet against radial movement, continuing the application of fluid pressure to cause the sheet to conform to the shape of said cavity and to fit in the corner portions of said cavity, cooling the sheet in the mold cavity, and removing the sheet from the mold cavity.

6. A method as defined in claim 5 wherein said radial outward pressure is applied to said edge by sliding the edge over a smooth hard dome surface which recedes gradually from its terminus as the heated sheet is moved by fluid pressure into said cavity, the radially inner portion of the sheet being clamped in position after said edge is located near the bottom of said dome surface, the portion of the sheet between the clamped marginal portion and said last-named radially inner portion being thereafter moved radially outwardly and downwardly into the deeper portions of the mold cavity so as to conform to the shape of the cavity.

7. A method of making a cup-shaped article of generally polygonal shape from a sheet of thermoplastic material comprising the steps of forming a hole in the central portion of said sheet, holding the marginal portions of said sheet and supporting the same over a mold having rigid peripheral walls defining a cup-shaped peripheral mold surface having a predetermined shape corresponding to that of the marginal portion of said article and having a dome rigidly mounted radially inwardly of said peripheral walls and surrounded by said walls for engaging the edge of said hole near the top of the mold cavity formed by said peripheral walls, said dome being centrally located relative to said peripheral walls and having a smooth polished rigid rounded convex surface that gradually recedes from its terminus toward the radially inner portion of said peripheral mold surface and extends more than half the distance between opposite sides of said peripheral surface, and creating a fluid pressure differential between opposite faces of said sheet to draw the sheet toward said peripheral mold surface while sliding the edge of said hole downwardly over the polished surface of said dome to a position near the bottom of said polished surface and causing the portion of the sheet radially outwardly of said dome to engage and conform to said mold surface.

8. A method as defined in claim 7 wherein the radially inner portion of the sheet is clamped in position against the bottom of the mold cavity along a narrow zone surrounding the dome after the edge of the hole has been enlarged by the dome and is located near the bottom of the dome and before the sheet conforms to the shape of said mold cavity.

9. Apparatus for forming a sheet of upholstery covering material from a thin thermoplastic sheet having a hole therein comprising a mold having an elongated cavity of a predetermined generally quadrilateral shape and a semi-ellipsoidal dome rigidly mounted at the center of said cavity and elongated in the same direction as said cavity for engaging the edge of said hole near the top of said cavity and for enlarging the hole as the plastic sheet is moved downwardly over the dome toward the bottom of said cavity, said dome having a smooth highly polished surface that recedes gradually from its terminus to the bottom of said cavity, said dome extending more than half the distance between opposite sides of said cavity, a narrow smooth generally flat surface surrounding said dome and extending radially from the polished surface of the dome to the radially inner edge of said peripheral mold surface, and hold-down means for clamping the plastic sheet against said narrow flat surface around the periphery of said dome after the edge of said hole is near the bottom of said dome and before the sheet conforms to said mold surface.

10. A mold for making a cup-shaped article of generally quadrilateral shape from a sheet of thermoplastic material having a central hole therein comprising rigid peripheral walls defining a cup-shaped peripheral mold surface having a dome rigidly mounted radially inwardly of said peripheral walls and surrounded by said walls, said dome being centrally located relative to said peripheral walls and having a smooth polished rigid rounded convex surface that gradually recedes from its terminus toward the radially inner portion of said peripheral mold surface, means for holding the marginal portions of said sheet and for positioning the sheet above said dome and said mold surface with the edge of said hole surrounding said terminus, means for creating a fluid pressure differential between opposite faces of said sheet to draw the sheet toward said peripheral mold surface while sliding said edge downwardly over said dome and to cause the portion of the sheet radially outwardly of said dome to engage and conform to said mold surface, hold-down means for clamping the radially inner portion of the sheet against the bottom of the mold cavity along a narrow zone surrounding the dome after the edge of the hole has been enlarged by the dome and is located near the bottom of the dome and before the sheet conforms to the shape of the mold cavity and means comprising a series of pushers mounted on said hold-down means for pushing the sheet into the deep corners of the mold cavity.

References Cited in the file of this patent
UNITED STATES PATENTS

| | | |
|---|---|---|
| 1,540,872 | Bates | June 9, 1925 |
| 2,007,548 | Sampson | July 9, 1935 |
| 2,032,832 | Blair et al. | Mar. 3, 1936 |
| 2,736,065 | Wilcox | Feb. 28, 1956 |
| 2,832,094 | Groth | Apr. 29, 1958 |
| 2,886,828 | Lattuca | May 19, 1959 |
| 2,889,651 | Baldanza | June 9, 1959 |
| 2,910,728 | Rowe | Nov. 3, 1959 |
| 2,917,783 | Olson et al. | Dec. 22, 1959 |

FOREIGN PATENTS

| | | |
|---|---|---|
| 1,165,692 | France | Oct. 28, 1958 |